Figure 9:
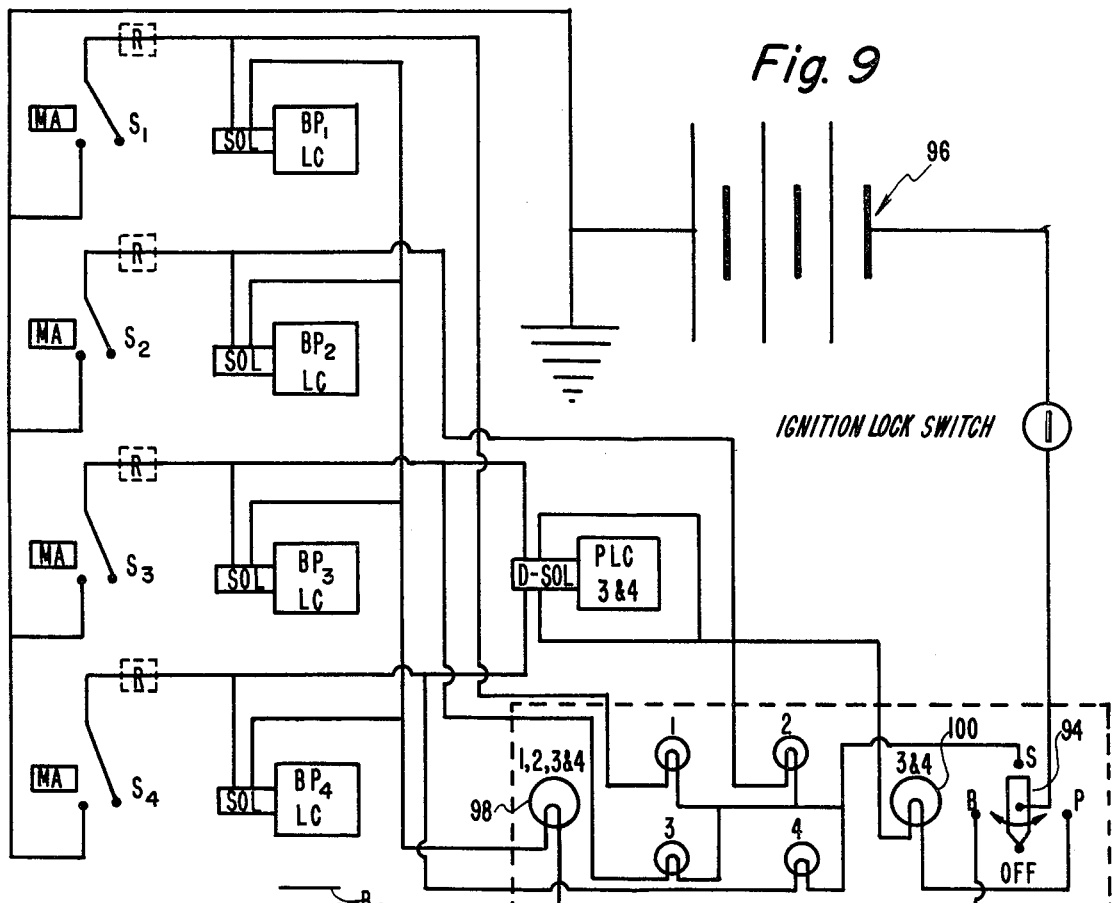

United States Patent
Pawl

[15] 3,668,629
[45] June 6, 1972

[54] VEHICLE ANTI-SKID AND ANTI-SPIN SIGNAL AND CONTROL DEVICE

[72] Inventor: Walter S. Pawl, 2844 Powder Mill Rd., Adelphi, Md. 20783

[22] Filed: Mar. 22, 1971

[21] Appl. No.: 126,601

Related U.S. Application Data

[63] Continuation-in-part of Ser. No. 806,344, Feb. 25, 1969, Pat. No. 3,608,980.

[52] U.S. Cl. .............................. 340/53, 340/262, 188/181, 303/21
[51] Int. Cl. ..................................... B60q 1/00, G08b 21/00
[58] Field of Search .................. 340/52, 53, 71, 262; 188/68, 188/180, 181; 303/21

[56] References Cited

UNITED STATES PATENTS

| | | | |
|---|---|---|---|
| 3,450,444 | 6/1969 | Ballard | 188/181 C X |
| 3,130,805 | 4/1964 | Carter et al. | 340/53 UX |
| 3,233,946 | 2/1966 | Lockhart | 340/262 X |
| 3,602,553 | 8/1971 | Cumming | 188/181 C X |

*Primary Examiner*—Alvin H. Waring

[57] ABSTRACT

A means for detecting the point at which the braking wheel begins to skid or the driving wheel begins to spin, by using circumferential accelerometers mounted on the wheels to indicate the initiation of a skid or a spin by an inertial displacement of each of the accelerometer weights as it passes the bottom of its rotation as the wheel starts to decelerate or accelerate its rotation faster than the resulting deceleration or acceleration of the vehicle, or is actually locked while the vehicle is still in motion, or is spinning while the vehicle is motionless. This displacement is used to control the means for reducing the maximum brake pressure or the maximum power that may be applied, to a maximum that the instant conditions of load, tire and road characteristics will permit without causing skidding or spinning of the particular wheel on which the accelerometers are mounted. Thus, by having the maximum pressure that may be applied to the brakes on each wheel, separately and automatically limited in this manner to get the maximum braking without skidding, a safe stop can be made even under the most hazardous conditions, in the shortest distance possible. Likewise, by having the maximum power applied, automatically limited in the same manner, to get maximum acceleration, a fast spurt to the desired speed can be safely and most speedily accomplished, even under adverse road conditions.

13 Claims, 11 Drawing Figures

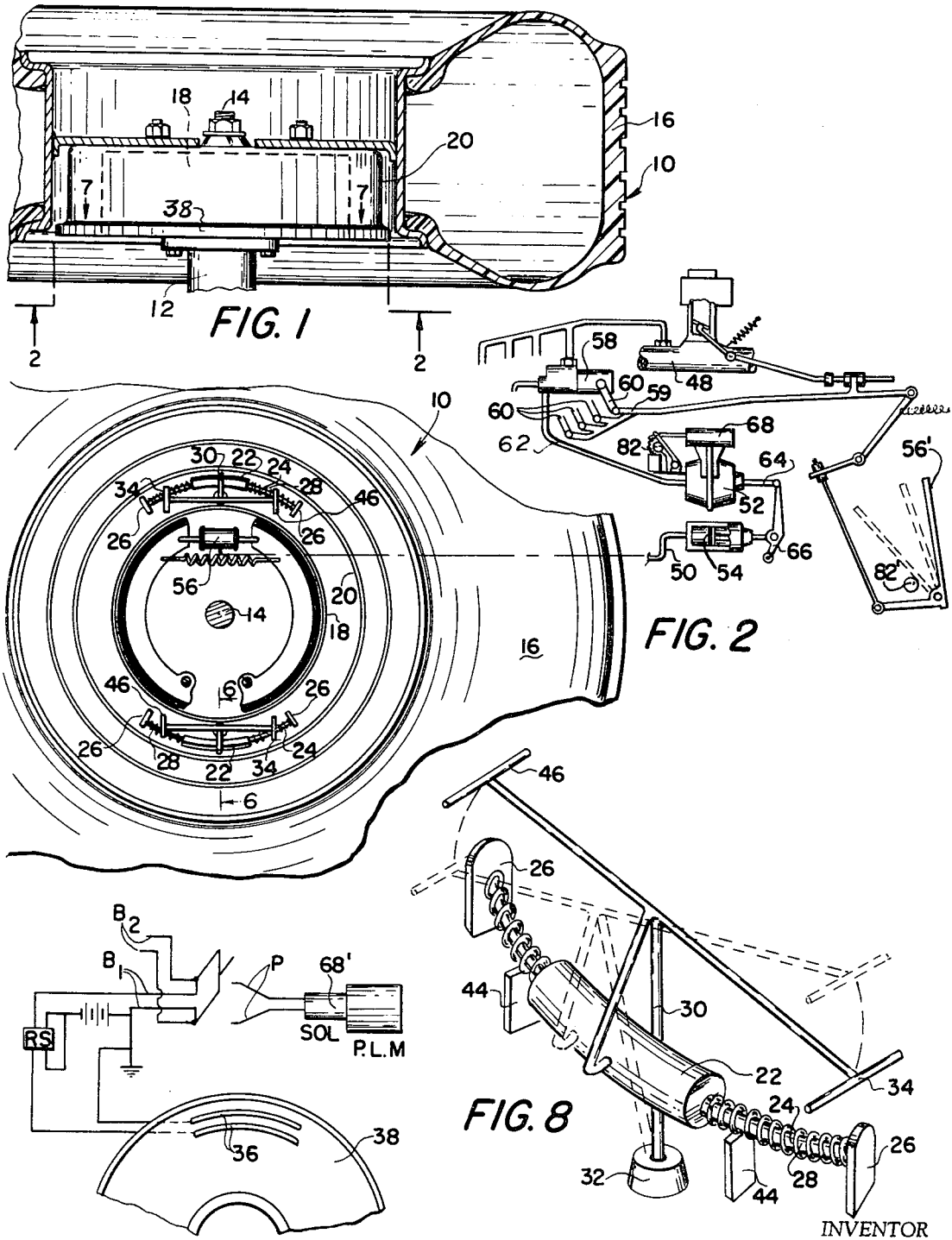

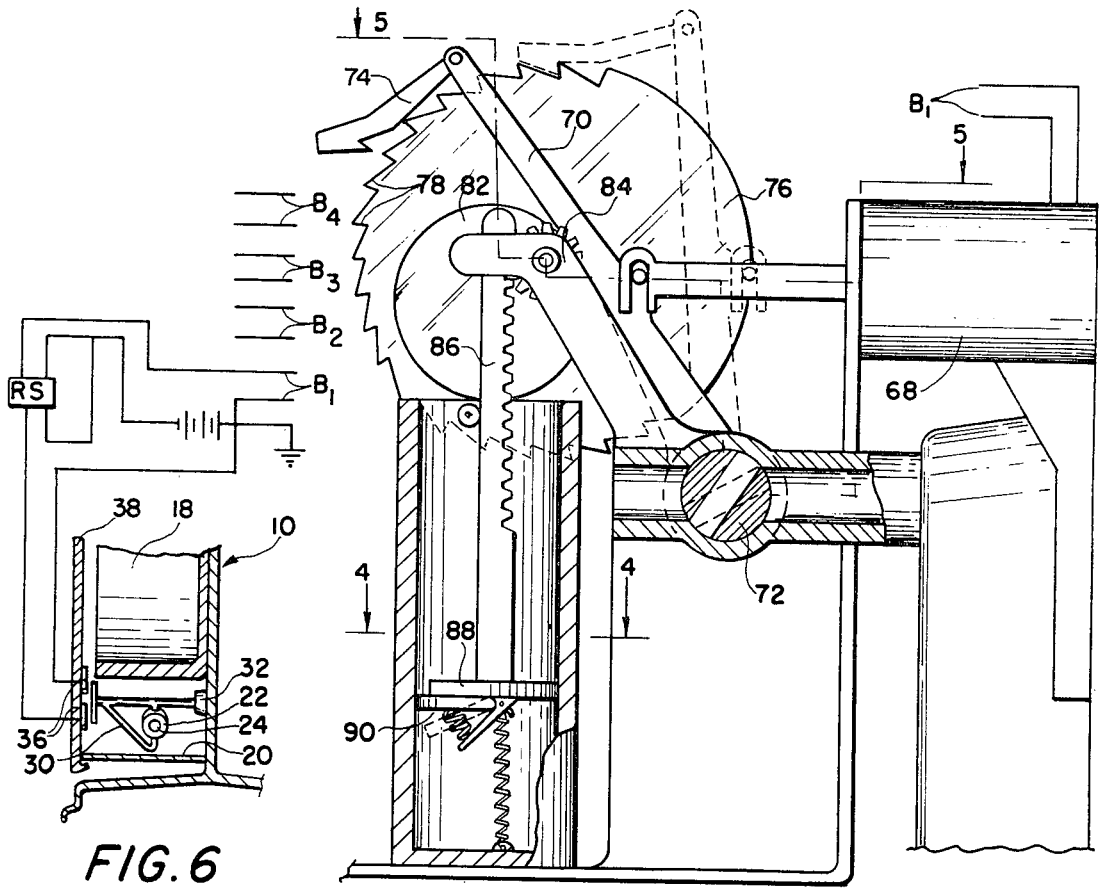
FIG. 6
FIG. 3
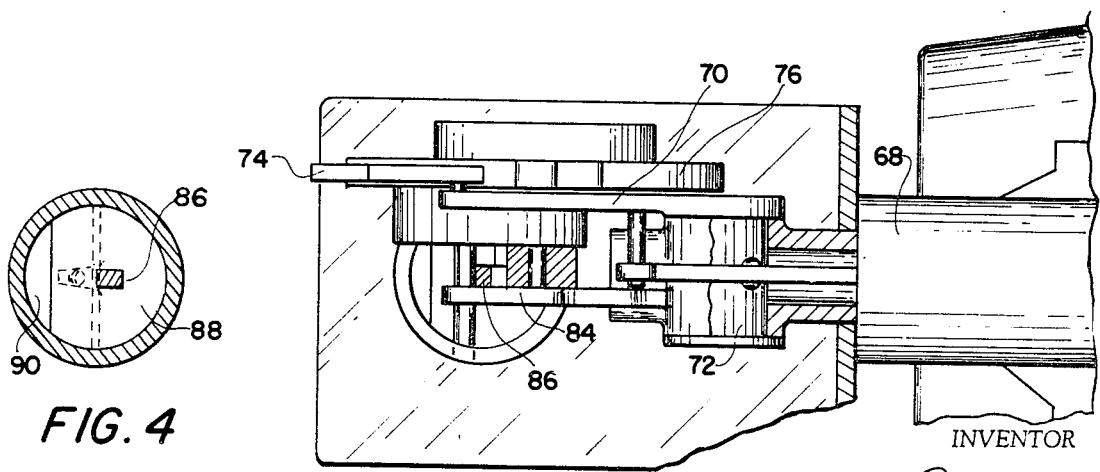
FIG. 4
FIG. 5
INVENTOR
Walter S. Paul

VEHICLE ANTI-SKID AND ANTI-SPIN SIGNAL AND CONTROL DEVICE

This is a continuation-in-part of my pending application Ser. No. 806,344, filed 2-25-69, now U.S. Pat. No. 3,608,980 for ANTI-SKID AND ANTI-SPIN DEVICE.

This application adds a disclosure of a modified form of sensing accelerometers and switches actuated magnetically thereby. Also a complete wiring diagram for a control panel with signal lights is shown, with a main switch for selectively energizing the signal lights alone for guidance of the driver in the manual adjustment of the brake pressure or power controls to avoid skids or spins, or energizing the circuits operating the automatic limit controls for either the brake pressure adjustment for avoiding skids or the power adjustment for avoiding spins.

Thus for quick get-aways or spurts of maximum acceleration the main switch may be turned to energize the signal light circuits, or the power limiting circuits for the drive wheels, and at all other times this switch may be kept in position to energize the brake pressure limiting control circuits in readiness for any emergency stops when excessive brake pressure might be accidentally applied.

Many and various devices have been and are being developed, using means responsive to the difference in speed of the car and its wheel rotation, as well as other means to detect skidding or spinning and to accordingly maintain a reduced braking pressure or power torque to eliminate the skidding or spinning. These methods generally involve very complex devices, sometimes including an auxilliary tracking wheel to measure actual ground speed, etc. None of these methods have been found to be very effective in shortening the stopping or desired speed attaining distance, because of time delays in detection as well as elimination of the skid or spin, and in unnecessarily reducing the brake pressure or power applied below the maximum no-skid pressure or no-spin torque.

The present device is simple and is adaptable to any systems of brake pressure and power application, in the operation of motor vehicles of any kind. It is illustrated, however, in connection with a system of the Hemphill type for automobiles such as disclosed in U.S. Pat. No. 2,871,999.

The object of this invention is to prevent skidding of a vehicle having controlled pressure brakes, when a stop is required within the shortest distance possible, as in an emergency stop, to avoid a collision with a pedestrian, another vehicle or other obstruction.

Another object is to provide a simple anti-skid device for vehicles with fluid pressure operated wheel brakes.

A further object is to use an accelerometer or accelerometers mounted circumferentially on a vehicle brake wheel having a brake pressure control for applying maximum pressure thereto, so that they will be responsive to any excess of rotational over linear inertias of the wheel upon less of static friction thereof with the road, to cause the operation of means to limit said maximum pressure by reducing it a small amount at each such response until said static friction is restored followed by a gradual restoration of the brake pressure toward its original maximum unless static friction is again lost for an instant as above.

A further object is to mount a plurality of circumferentially spaced accelerometers symmetrically around the outside of a wheel brake drum, each provided with a trolley lever operated by displacement of the accelerometer weight from its normal position, to project the trolley against a stationary arcuate trolley wire portion mounted adjacent the bottom of the wheel for closing a control circuit for operation of a pressure limiting means for limiting the maximum brake pressure that may be applied without causing loss of static traction or wheel skidding.

A further object is to use the same control circuit on the drive wheel of the vehicle, by switching it over, to operate a power control limiting means on the throttle of the driving engine, to maintain the highest permissible acceleration of the vehicle that will not cause kinetic traction or wheel spinning.

A further object is to provide a skid and spin avoiding means including sensing means on the brake and/or drive wheels of a vehicle, to sense the loss of static traction of the corresponding wheel during deceleration or acceleration of said vehicle in either direction of travel, when too much brake pressure or power is applied, respectively, to retain said static traction; and to provide brake pressure and power limit control means actuated by said sensing means in response to loss of said static traction as soon as a skid or spin is initiated, to instantly reduce said brake pressure or power respectively, sufficiently to restore said static traction and promtly return said limit control means to a position allowing a maximum brake pressure or power to be applied respectively, short of losing said static traction, whereby application of full brake pressure or full power, in an emergency, will bring the vehicle to a stop or a desired speed will be attained respectively, within the shortest possible distance of travel.

A further object is to assist a driver in the operation of his brake and power controls, to limit his application of maximum brake pressure or power to the brake or power wheels respectively, that will effectively avoid any extended skids or spins of the corresponding wheels, should he accidentally exceed such limit in his anxiety to make sure that he is applying enough brake pressure or power respectively.

Figure 10:
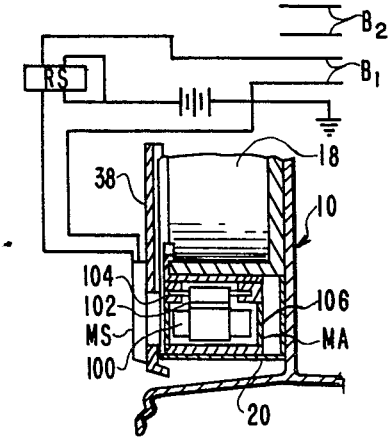
Figure 11:
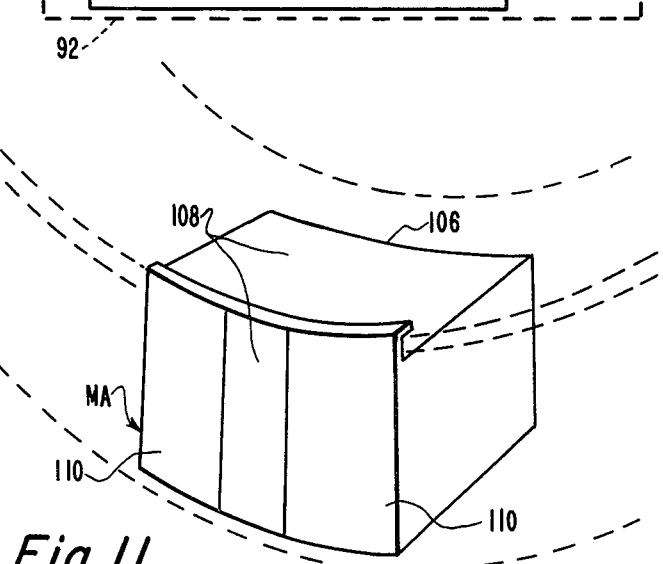

Other and more specific objects will become apparent in the following detailed description of the present invention, as illustrated in the accompanying drawings, wherein:

FIG. 1 is a horizontal sectional view of a mounted vehicle wheel, over the top of the brake drum and accelerometer and axle housings, FIG. 2 is an elevational inside view of the wheel taken on the line 2—2 in FIG. 1, and a diagrammaticla illustration of the power controls and fluid pressure system connected thereto, FIG. 3. is an enlarged detail view of the brake pressure limit controls, partly in section, FIG. 4 is a detail sectional view taken on the line 4—4 in FIG. 3, FIG. 5 is a plan view, partly in section taken on the line 5—5 in FIG. 3, FIG. 6 is a sectional detail view taken on the line 6—6 in FIG. 2, showing diagrammatically the solenoid operating circuit, FIG. 7 is a detail view of a portion of the cover plate fixed to the axle housing and showing the trolley wire portion on the inner face thereof, also showing diagrammatically how a double throw switch may be used to selectively connect the control circuits of two drive wheels to a common power limiting control means, FIG. 8 is an enlarged perspective view of the trolley lever, showing the double armed trolley for responding to displacement of the accelerometer weight in either direction, FIG. 9 is a wiring diagram of the selective controls of the several circuits for the brake pressure and power limiting controls and indicator signals, to assist the driver in manually or automatically limiting the corresponding controls within proper limits to avoid skids and spins in panic stops or quick acceleration maneuvers, FIG. 10 is a sectional view similar to FIG. 6, but shows a magnetic type of sensing accelerometer and switch actuated thereby, and FIG. 11 is an enlarged perspective view of a suitable form of magnetic accelerometer that may be used in this invention.

It is to be noted that the vertical axial plane element of a vehicle wheel in motion is in static friction contact with the ground during vehicle acceleration or deceleration only under no-skid or no-spin rolling traction thereover; i.e. as long as the rotational deceleration of this element at any point directly below the axis of the wheel at its contact with the ground does not exceed the linear deceleration of the wheel as a part of the vehicle, as the braking pressure increases. Static traction is likewise maintained during acceleration of the wheels only so long as the acceleration of the wheel rotation does not exceed the vehicle acceleration.

The present device immediately senses the skid or spin by the displacement of the accelerometer weights from normal position as they approach the bottom of their rotation. The displacement at this point actuates the double armed trolley to close the solenoid operating circuit and rapidly reduce the brake pressure to restore static friction between the wheel and the ground, and lets the pressure gradually build up so as to get the benefit of the greatest pressure that will not lose that static friction, even under continually changing road conditions. The trolley is similarly actuated when spin occurs during driving acceleration to reduce the power applied and restore static friction, while always gradually returning to maximum power so as to permit a substantially continuous maximum driving torque just short of causing the drive wheels, or any one of the drive wheels to spin.

In starting or stopping, obvious advantages will thus be obtained by the use of the present device, including:
1. Increased safety.
2. Less tire wear.
3. Better directional stability.
4. Comfort, reliability, economy, etc.

Referring now to the drawings, an automobile wheel 10 is shown in FIG. 1, mounted over the end of a rear axle housing 12 on shaft 14. It has a tire 16 and brake drum 18 and shield 20 housing a pair of accelerometers around the drum, as shown. Each accelerometer comprises a weight 22 slidably mounted on circumferential bar 24 which is fixed to the wheel on supports 26 at its ends. Balanced springs 28 hold the weight 22 normally in the center of the bar. A trolley lever 30 is pivotally mounted on the weight 22 and has its inner end pivoted in socket bearing 32 so that upon any circumferential displacement of the weight 22, from its normally central position on the bar, as it passes the vertical axial plane of the wheel at the bottom of its rotation therewith, the lever 30 will be actuated to project the trolley 34 or 46 outwardly against the trolley wires 36 which are mounted on a peripherally extended portion of the normal cover plate 38 on which the brake shoes 40 are usually mounted and which extends from the axle housing to cover the brake drum opening and the opening of the accelerometer shield 20 around the brake drum.

The weight 22 may be provided with rollers bearing on the opposite sides of the bar 24 to reduce the sliding friction of the weight thereon as it responds to the changing inertia forces thereon during acceleration or deceleration of the wheel. Only a slight displacement of the weight is required to move the trolley lever 30 far enough to project the conductive trolley 34 or 46 out against the wires 36, and a stop member 44 may be fixed to the drum as shown to prevent too much unnecessary displacement of the weight from its normal central position.

The trolleys 34 and 46 are mounted on arms extending from the lever 30 in opposite directions and the trolley 46 is projected outwardly in response to the imbalance between the rotational and linear inertias of the corresponding weight 22 to close the circuit to prevent skidding when applying maximum brake pressure while driving in reverse, or to prevent spinning of the wheels while applying maximum power in forward drive, just as the trolley 34 is projected in a similar manner to close the circuits to prevent skidding while driving forwardly or to prevent spinning of the drive wheels while driving in reverse.

The two accelerometers shown are placed on opposite sides of the wheel axis for dynamic balance. However, any other plurality of accelerometers may be used to provide more frequent corrections of the limit controls of either the maximum brake pressure or the power applied, as the case may be; but in each case, these accelerometers should be symmetrically distributed around the wheel axis to prevent dynamic imbalance.

The brake system with which this accelerometer device is connected for purposes of illustrating the operation of this invention is of the Hemphill type mentioned above. However, this device is similarly applicable to any other braking system where the full brake pressure may be controlled to reduce it in small increments and continuously restored therebetween, so that the highest pressure is substantially continuously maintained which will not cause skidding. It is likewise applicable to any other power application system where the full power control may be reduced rapidly by small increments and gradually restored between these reductions so that the highest power is substantially continuously maintained which will cause no spinning.

As shown in the drawings, the liquid pressure line 50 transmits the brake pressure from the power booster 52, which actuates the piston 54, to the brakes through the opposed plungers in unit 56 whenever the accelerometer foot pedal 56' is released into the brake control range. This is so because intake vacuum from the intake manifold 48 is applied by operation of the valve 58 through its control lever 60, to the booster chamber on its near side of the diaphragm (not shown) in the booster by way of the line 62, and the diaphragm being connected by rod 64 to the lever 66, actuates piston 54 to provide the brake pressure in accordance with the control of the valve 58.

The illustration in the drawings shows a gang control rod 59 for four of these valves, one for each of the four individual brake pressure systems for a vehicle with four-wheel brakes, each individual brake system operating independently of the others, in limiting the brake pressure on their respective wheels in the same way as the one shown.

The solenoid terminals $B_1$, $B_2$, $B_3$, and $B_4$ of the independent control circuits for each wheel are shown diagrammatically in FIG. 6, and each circuit, like the one having the solenoid terminals B, includes the relay switch RS actuated by the projection of the respective trolley 34 or 46 against the trolley wires 36 at the initiation of any skid, to close the relay switch circuit which in turn closes the solenoid circuit, the leads $B_1$ of which are connected to the brake solenoid 68. This solenoid provides the impulses tp lever 70 for opening the bleed valve 72 which is connected to the booster chamber to instantly lower the brake pressure sufficiently to regain static friction of the corresponding wheel tread on the road; at the same time the hook lever 74 which is pivoted to it, moves the cam 82 through an arc equivalent to the span on one tooth 78. The spring in the solenoid immediately returns the lever 70 to rest against the cylindrical stop cam 82 which is eccentrically mounted on gear 76 and carries a gear 84 fixed thereto axially of gear 76, so that successive impulses of solenoid 68 will further move the cam 82 to stop the lever 70 at an increased opening of the bleed valve 72 so as to reduce the brake pressure sufficiently to avoid skidding, and the gear 84 will raise the tooth rack 86 which is connected to the plunger 88 which is damped in its downward movement by a segmental valve 90 so as to gradually return the cam 82 between impulses toward a higher brake pressure limit position. Thus the system automatically adjusts itself substantially continuously toward a maximum brake pressure position under which no skid occurs, assuring a maximum static friction of the wheel treads on the road regardless of the conditions of the road surface or any changes therein, in the event a shortest distance is required for stopping, as in a panic stop. Otherwise tthe brakes may be operated normally to control the speed of the vehicle as desired.

In reverse driving, the brake system controls will operate in the same manner in an emergency stop, except that the circuits will be actuated in response to the projection of the opposite trolley 46, since the displacement of the weights 22 will be in the reverse direction upon sensing any skidding of the corresponding wheels.

When these circuits are used to control the power applied for maximum no-spin acceleration, obviously the solenoid circuits will be effective in limiting the maximum applied power, and may be connected in parallel to operate one solenoid 68' for operating the engine throttle limiting means, including the cam 82', to limit the power applied similarly to operating the bleed valve limiting means for limiting the brake pressure.

FIG. 9 illustrates a simple signal indicator and control panel 92 for use on the dash of a vehicle having four brake wheels, two of which are also drive wheels. This panel may be wired to the switches actuated by the sensing accelerometers, and to the several limit controls and signal lights as shown, the accelerometers MA being shown diagrammatically for each of the four wheels, for actuating the corresponding switches $S_1$, $S_2$, $S_3$ and $S_4$. These switches are normally open and are actuated to closed position by the accelerometers on the corresponding wheels, to complete the solenoid and/or signal circuits as shown. Relay switches, shown in dotted lines, may be used to prevent overloading of the sensitive switches $S_1$, $S_2$, $S_3$, $S_4$.

The main switch 94 on the panel 92, is shown in its OFF position, and has three other contacts B, S and P at 90° intervals. Electric power may be supplied to switch 94 when the ignition lock switch is turned on. Electric current may thus be selectively supplied from the battery 96 (or any other source of power), through the main switch 94 when turned to contact B, to all the switches through a signal light 98 on the panel and through the individual wheel brake pressure limiting control operating solenoid, to the corresponding one of the switches $S_1$, $S_2$, $S_3$ and $S_4$. When the main switch is turned to contact S, current is supplied to all of these switches through their individual indicator signals designated 1,2,3 and 4 on the panel; and when the main switch is turned to contact P, current is supplied to the switches $S_3$ and $S_4$ through the signal 100, and through each of the respective solenoid coils of the power limiting control operating solenoid, to the corresponding switch individually.

A double coiled solenoid D-SOL is used for operating the power limiting controls PLC, so that separate signals 3 and 4 may be independently operated to indicate which of the switches $S_3$ or $S_4$ is actuated when the main switch 94 is turned to contact S.

The knowledge of which wheel is losing its static traction is important to the driver, to assist him in the proper manipulation of his controls. It will also assist him in immediately supplying anti -skid materials to the proper wheels, in the event he has facilities in the vehicle.

Although the indicator signals are illustrated as flashing light signals, they could obviously be buzzers or any other form of suitable signals of distinctive colors or audio sounds, which would not require him to take his eyes off the road at any instant.

Many obvious modifications in the details and arrangement of parts of this disclosure may be made without departing from the spirit and scope of this invention.

For example, the individual wheel circuits may each have an individual switch for switching the solenoid terminals of only the driving wheels in parallel to a single throttle limiting control solenoid 68', in order to make a quick start as shown in FIG. 7; and the relay switch circuit of each brake wheel may be switched to its individual solenoid 68 at all times except while making a quick getaway.

Furthermore, while this invention is shown in a specific form in this disclosure, it is to be understood that the invention is not to be limited in any way, but includes its application to any type of wheeled vehicle for providing a no-skid and no-spin device for the wheels which have means in the vehicle for increasing the rate of speed change of said vehicle at controlled maximum limits when required , while the vehicle is driven in either the forward or reverse direction, during quick stops or quick getaways where these maximum limits can be automatically substantially continuously maintained at a value below that which would initiate kinetic road friction, i.e. skidding or spinning, under the instant traction conditions, and which would provide static road friction or traction at the maximum rates of speed change possible.

The principle upon which this device operates is based on the fact that the accelerometer weights remain in normal central position as they pass the vertical below the wheel axis, only under static traction conditions during either acceleration or deceleration of the vehicle. Under these conditions, as they pass the vertical below the axis, their horizontal component of rotational inertia is equal and opposite to their linear inertia as a part of the vehicle of which the wheel is a part. However, if their rotational inertia exceeds their linear inertia at this point, indicating a loss of static traction, an imbalance occurs, causing the weight to be displaced from its central balanced position. Thus the trolley is projected to contact the trolley wires at this point, or the magnetic accelerometer actuates the normally open magnetic switches into closed position, to complete or close the circuit which actuates the solenoid to provide the impulses which cause static friction conditions to be instantly regained while providing a damped return between these impulses to the maximum static friction conditions so as to substantially maintain said maximum static friction during panic stops or quick spurts.

Thus the closing of the switch may be accomplished either by the accelerometer weight actuating a trolley to project across the gap between the rotating accelerometer and the stationary switch contacts, or the accelerometer weight could be a magnet moving into an effective position to actuate a magnetic switch across the gap.

Such accelerometer magnet could be normally shielded by a casing of magnetic material, provided with windows of non-magnetic material for projecting the magnetic field therethrough across the gap when the magnet is displaced in the event of a skid or a spin, to actuate the normally open magnetic switch into closed position.

FIG. 10 illustrates one of such magnetic accelerometers MA mounted around the edge of the brake drum 18, and a magnetic switch MS mounted on the lower edge of the cover plate 38 closely adjacent the path of the accelerometers MA for actuation thereby during a skid or spin of said wheel.

The magnet 100 serves as the accelerometer weight and is pivotally suspended by the arm 102 in bearings 104 in its casing 106 which is made of magnetic material 108 as seen in FIG. 11 to provide a shield for the magnetic field except for the non-magnetic portions 110 which provide windows to enable the magnet weight when displaced, to project its magnetic field therethrough across the gap to actuate the magnetic switch MS whenever a skid or spin is started.

For the sake of simplicity in FIG. 9, the switches $S_1$, $S_2$, $S_3$ and $S_4$ are shown as being directly connected to their respective operating circuits, but in actual practice it might be desirable to connect them through relay switches R as mentioned above.

What is claimed is:

1. An anti-skid and anti-spin control device including an indicator signal means comprising at least one accelerometer mounted circumferentially on a common radius, on each brake and drive wheel of a power driven vehicle having a brake pressure control for the brake wheels and a power control for the drive wheels, said accelerometers being responsive to any imbalance between the rotational and linear inertias of the corresponding wheel at its contact point with the road, indicating the start of a skid or a spin due to the application of excessive brake pressure or of excessive power respectively, a stationary switch for each of said wheels, mounted below the wheel axis closely adjacent the path of said accelerometers for actuation thereby in response to such imbalance of the corresponding wheel, and a signal in the driver's vicinity and operated by said switch to indicate a skid or spin as soon as it is started, to assist the driver in immediately regaining static traction and promptly returning to the maximum brake pressure or power that will not cause another loss of static traction.

2. An anti-skid and anti-spin control device as defined in claim 1, said stationary switch being a magnetic switch, and said accelerometers each including a magnetic weight portion movable from its normally shielded position, in response to said imbalance into an effective non-shielded position to actuate said magnetic switch by a magnetic impulse across the gap between the moving accelerometer and the stationary switch, said signal being a flshing light, and said switches on all the brake and/or drive wheels being connected in parallel to said signal light.

3. An anti-skid and anti-spin control device comprising at least one accelerometer mounted circumferentially on a common radius, on each brake and drive wheel of a power driven vehicle having a brake pressure control for the brake wheels and a power control for the drive wheels, said accelerometers being responsive to any imbalance between the rotational and linear inertias of the corresponding wheel at its contact point with the road, indicating the start of a skid or a spin due to the application of excessive brake pressure or of excessive power respectively, a stationary switch for each of said wheels, mounted below the wheel axis closely adjacent the path of said accelerometers for actuation thereby in response to such imbalance of the corresponding wheel, and a brake pressure limiting control operating circuit connected to said switch and having means to instantly reduce said brake pressure sufficiently to regain static traction at said wheel and to immediately return said brake pressure limiting control as closely as possible to the previous maximum before the loss of static traction.

4. An anti-skid and anti-spin control device as defined in claim 3, and a signal in the driver's vicinity included in said switch operated circuits to indicate said loss of static traction.

5. An anti-skid and anti-spin control device as defined in claim 4, all of said limiting control circuits being connected in parallel to a single signal indicating loss of static traction at any of said wheels.

6. An anti-skid and anti-spin control device as defined in claim 5, said signal being a flashing light.

7. An anti-skid and anti-spin control device comprising at least one accelerometer mounted circumferentially on a common radius, on each brake and drive wheel of a power driven vehicle having a brake pressure control for the brake wheels and a power control for the drive wheels, said accelerometers being responsive to any imbalance between the rotational and linear inertias of the corresponding wheel at its contact point with the road, indicating the start of a skid or spin due to the application of excessive brake pressure or of excessive power respectively, a stationary switch for each of said wheels, mounted below the wheel axis closely adjacent the path of said accelerometers for actuation thereby in response to such imbalance of the corresponding wheel, and a power limiting control actuated by a circuit operated by any of the switches for the drive wheels, said drive wheel switches being connected in parallel to said common power limiting control operating circuit, said limit control having means for instantly reducing the power applied sufficiently to restore static traction and promptly returning said power control as close as possible to the maximum applied just before losing static traction at said drive wheels.

8. An anti-skid and anti-spin control device as defined in claim 7, and a signal in the vicinity of the driver connected in said limiting control circuit.

9. An anti-skid and anti-spin control device as defined in claim 7, and a brake pressure limiting control circuit for each brake wheel circuit adapted for connection to the switches on the corresponding wheels, said limiting control having means for instantly reducing the brake pressure on said wheel to restore static traction, and for returning as close as possible to the maximum brake pressure previously applied just before losing static traction.

10. An anti-skid and anti-spin control device as defined in claim 9, and a skid signal in the vicinity of the driver connected to the brake pressure limiting control circuits, and a spin signal similarly located and connected to the power limiting control circuit.

11. An anti-skid and anti-spin control device as defined in claim 10, and a main control switch for selectively activatively activating either the brake pressure limiting control circuits or the power limiting control circuit, as desired.

12. An anti-skid and anti-spin control device as defined in claim 11, and a signal circuit connected directly to each brake wheel and drive wheel switch, said signal circuits having a common terminal contact in the main control switch in an additional position for selectively activating the signal circuits alone to aid the driver in manual adjustment of the brake pressure or power controls respectively to maintain skidless or spinless maximum deceleration or acceleration driving operations, in emergency stops or starts.

13. An anti-skid and anti-spin control device for vehicles having at least one brake wheel and one drive wheel, and brake pressure control means and power control means for the respective wheel or wheels, comprising sensing means mounted circumferentially on each brake wheel and/or drive wheel responsive to any imbalance in either direction, between the rotational and linear inertias of the corresponding wheel at its road contact point, including accelerometers mounted on said wheels, switch means mounted on the vehicle below the wheel axis closely adjacent to the path of the accelerometers on the corresponding wheel, said switch means being actuated by said sensing means to close an operating circuit when such imbalance occurs, a signal connected to said operating circuit to indicate to the driver the loss of static traction, to assist him in manipulating the brake pressure control means or the power control means to restore and maintain the highest static traction possible under the instant road conditions in either forward or reverse drive.

* * * * *